Patented Jan. 10, 1928.

1,655,809

UNITED STATES PATENT OFFICE.

AUSTIN DAY BRIXEY, OF GREENWICH, CONNECTICUT, ASSIGNOR TO THE REPLITURA CORPORATION, A CORPORATION OF NEW YORK.

MOVING-PICTURE CABINET.

Application filed October 11, 1919, Serial No. 330,094. Renewed November 7, 1924.

This invention relates to moving picture cabinets.

One object of the invention is to removably mount the picture screen so that it may be removed for cleaning or repair or give access to parts within the cabinet and behind the screen, and for similar purposes.

A further object of the invention is to provide a mounting of the projecting apparatus in the cabinet such that it may be readily moved from its operating position to a position more convenient for threading in the film or for other purposes.

A further object of the invention is to provide improved securing and adjusting means for the moving picture projecting apparatus.

Other and ancillary objects will appear hereinafter.

In the accompanying drawings which illustrate the invention—

Figure 1:
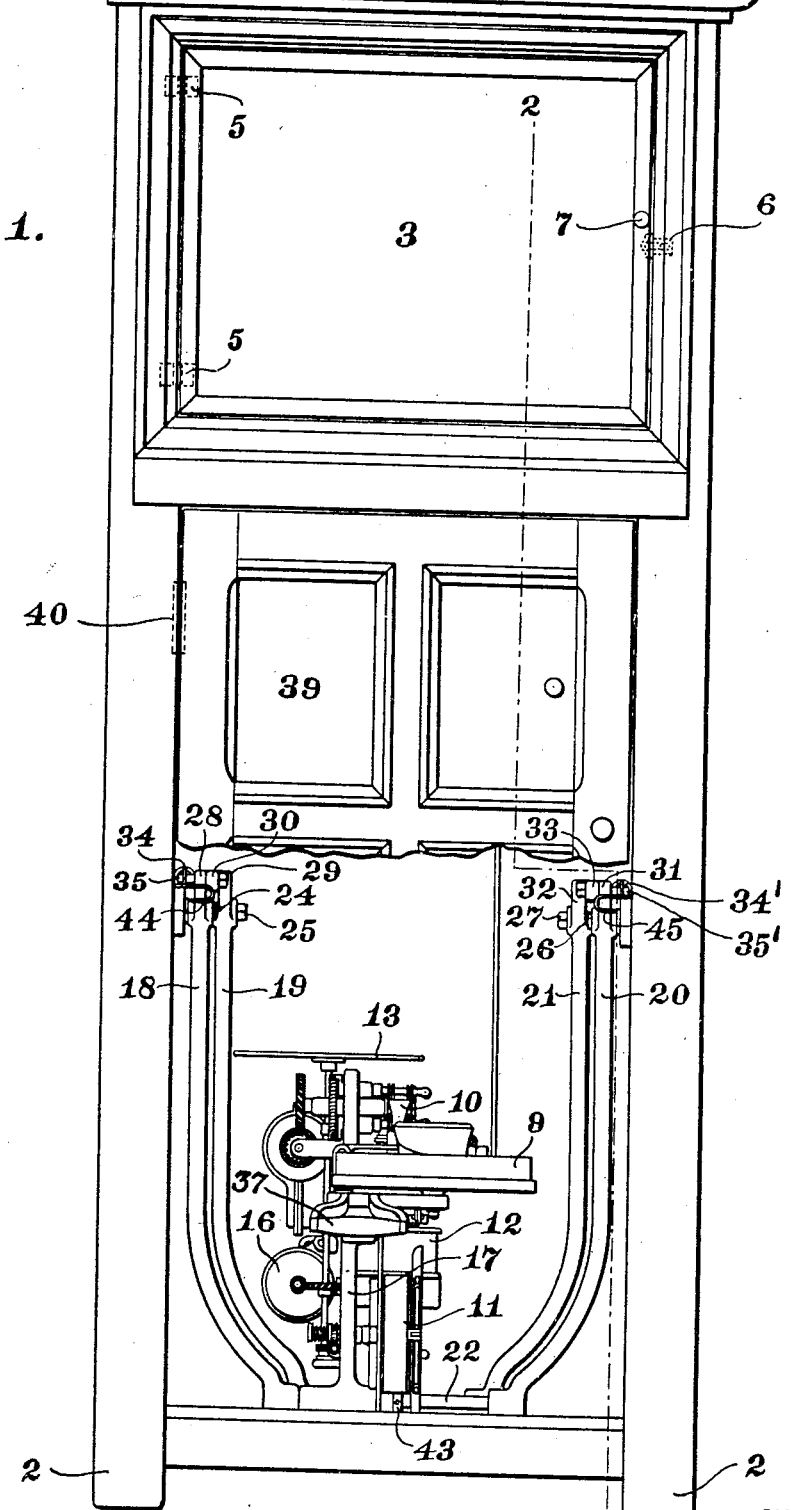
Figure 2:
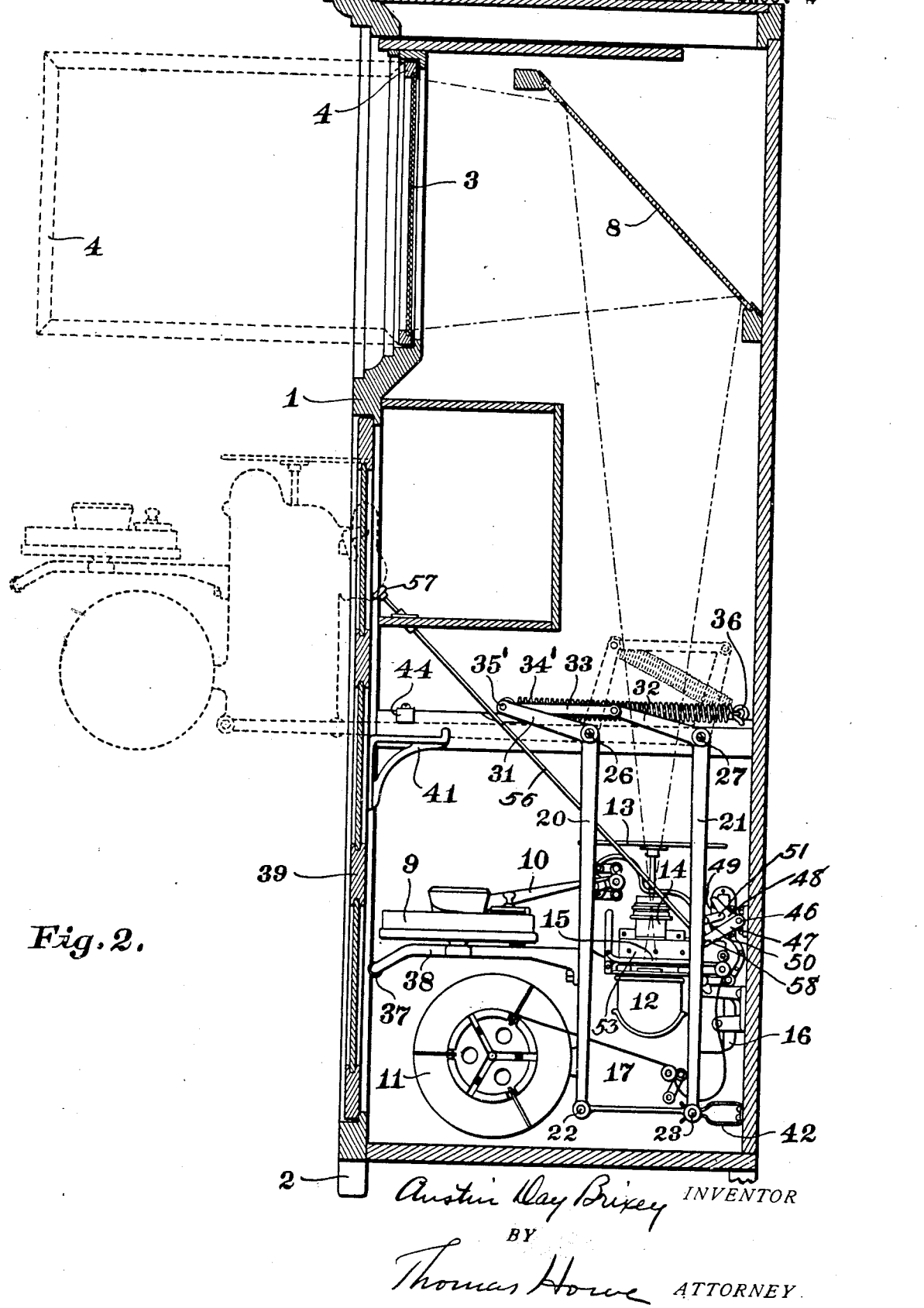

Fig. 1 is a front elevation of a cabinet containing the improved apparatus partly broken away so as to show the moving picture apparatus within; and Fig. 2 is a section on the line 2—2 of Fig. 1.

Referring to the drawings, the cabinet 1 has a greater vertical dimension than either of its horizontal dimensions and rests upon the feet 2. Near the top of the cabinet at the front thereof is an opening for the picture screen 3 carried by a frame 4 which is hinged at one side of the frame by hinges 5 and may be secured in closed position by a snap catch 6. Secured to the screen frame is also a knob 7 which may be laid hold of in opening and closing the door. The screen and frame may be swung on the hinges into position as indicated in dotted lines in Fig. 2, thereby leaving the screen opening in the cabinet clear so as to give access to the interior.

Back of the screen is a mirror 8 supported upon the cabinet and inclined at an angle to the rays of projected light as indicated by the dot and dash lines, and adapted to reflect the light to the screen. The screen is of the transmission type and while it may be of many different constructions, those constructions shown in my Patents Nos. 1,204,401 of November 14th, 1916, and 1,269,046 of June 11th, 1918, are well adapted for the purpose.

The projector comprises the paying out reel 9 for the film 10 which, after passing across the window of the projector, is wound upon the take up reel 11. The lamp house is shown at 12, the shutter at 13, the lens carrying tubes at 14 and the film guiding and supporting means, adjacent the window at 15. The apparatus is driven by a suitable electric motor 16 which is accomplished through suitable gearing which need not be here referred to in detail.

The projecting apparatus as just described is mounted upon a casting or frame 17 so as to form a unitary structure. This structure is pivotly suspended from the cabinet so that it may occupy its operating position as shown by the full lines or may be swung into the position as indicated by dotted lines in Fig. 2 so as to be in a better position for inspection or repair or the insertion or exchange of films. This pivotal suspension is accomplished by means of bell cranks consisting of the cranks 18 and 19 on one side and 20 and 21 on the other. Extending between the lower extremities of the long arms of the bell cranks 18 and 20 is a round bar 22 journaled in the casting 17 near its forward end, while between the long arms of the cranks 19 and 21 extends a round bar 23 which is journaled in the casting 17 near its rear end. As will be seen the long arms of the cranks 19 and 21 are arranged inside of the long arms of the cranks 18 and 20 so that they may pass within them when the projecting apparatus has been moved into the position indicated by the dotted lines. The bell cranks 18 and 19 are pivoted to the side of the cabinet at 24 and 25 while the cranks 20 and 21 are pivoted to the other side of the cabinet at 26 and 27. The short arms 28 and 29 of the bell cranks 18 and 19 are secured together by a link 30 which is pivoted at its ends to the ends of the arms 28 and 29. Similarly the short arms 31 and 32 of the cranks 20 and 21 are connected by a link 33. The lower ends of the long arms of the cranks are thus held in fixed spaced relation so that the projecting apparatus will not be tilted as it moves into and out of the operating portion. On the contrary it will be maintained substantially against angular movement about any axis through it throughout the shifting operation by means of the parallel motion as described.

To counterbalance the weight of the picture apparatus two springs 34 and 34' are provided. The spring 34 has one end secured to the pivot pin 35 and its other end secured to the cabinet at 36, while 34' has one end secured to the pivot pin 35' and its other end to the cabinet. It will be seen from Fig. 2 that in the lower or operating position of the projector as shown by the full lines in Fig. 2, the axis of the spring 34 is very close to the pivotal points 24 and 25 and the axis of the spring 34' is very close to the pivotal points 26 and 27 so that a comparatively slight force tending to shift the projecting apparatus is exerted. It, however, renders it easy when grasping the handle 37 on the forwardly projecting arm 38 which is secured to the casting 17, to swing the apparatus outwardly on the pivots 24, 25, 26 and 27 and it will be seen that as the apparatus is moved outwardly and the lever arm by which it tends to fall within the cabinet is increased, the leverage of the spring 34 is also increased until, when the apparatus has reached its position of maximum leverage about the pivots namely that indicated by the dotted lines of Fig. 2, the springs 34 and 34' will have their greatest leverage and effect in maintaining the apparatus elevated. This position of the spring and its connected arms is indicated by the dotted lines of Fig. 2. By this means the weight of the apparatus is variably counterbalanced as it moves outwardly and upwardly and its movement about the pivots increased, whereby slight effort is required by the operator to move it or maintain it in position at any point throughout its travel.

The door 39 in front of the cabinet and which is hinged thereto as at 40 is swung open previously to moving the apparatus into the dotted line position of Fig. 2. This door carries a bracket 41 extending at substantially right angles to the door. When it is desired to swing the apparatus outwardly the door is opened sufficiently wide so that the apparatus will clear the bracket 41. When the apparatus has been moved to the position above the bracket the door is closed sufficiently to cause the bracket to extend beneath the apparatus when it will form a rest for maintaining the projecting apparatus in elevated position. The operator is then free to use both hands to install the film or perform such other operations upon the apparatus as he may desire.

To secure the apparatus in its operating position a spring catch 42 may be secured to the back of the cabinet in such position as to embrace the bar 23 when it is in the operating position of the apparatus.

The casting 17 may be prevented from sliding along the bars 22 and 23 by a collar 43 secured to the shaft 22 by a pin or set screw.
To limit the upward movement of the apparatus, spring buffers 44 and 45 are provided against which the long arms of the cranks 18 and 20 abut in coming to their uppermost position.

Journaled in the cabinet is a shaft 46 having fixed upon it the crank 47 and also a crank 48 having alligator jaws enclosing a V-shaped recess 49. Pivoted at 50 upon the frame 17 of the projector is a bell crank 51 having one end engaging in a slot at the apex of the recess 49 in the crank 48. The other end engages by a pin and slot connection with a strip 53 carrying the film holding devices and slidable horizontally on the frame 17 of the projecting apparatus. As, therefor, the bell crank 51 is turned about its pivot 50 the film carrying apparatus and film are moved across the window of the projector so that this provides a framing means. The turning of the bell crank can be accomplished by means of the crank 47 fixed upon the shaft 46 and pivoted at 55 to a rod 56 which extends upwardly and to one side of the cabinet where it terminates in a handle or button 57 which is just within the door 39 where it may be conveniently grasped when the door is open. By pushing or pulling on the rod, the bell crank 51 may be turned on its pivot so as to shift the slide 53 and so adjust the film with relation to the window as to secure proper framing.

The film carrying members having been set as described, the apparatus may be moved from its lowermost and operating position, as shown in full lines, outwardly and upwardly to a point as shown by the dotted lines, if desired, and still the proper framing adjustment will exist when the apparatus is in operating position. This will appear from the following considerations: When the apparatus is moved outwardly from its operating position, the bell crank 51 will part from the crank 48, the end of the bell crank passing out of the alligator jaws. The desired actions having been taken with regard to the apparatus, it is returned to the operating position when the end of the bell crank 51 will again enter the alligator jaws and be guided to the position which it occupied previous to its removal so that the adjustment of the film carrying devices and consequently the framing of the picture will be what it was before. It will be seen that however much the adjustment may be displaced during the outward and upward excursion of the apparatus, this cannot be sufficient in amount to displace the end of the bell crank 51 outside the scope of the alligator jaws, further that the adjustment of the alligator jaws remains fixed the apparatus parting company with and moving out of engagement with them when the former is moved from its operating position. Consequently any throwing out of adjustment of the film carrying device which may occur during the excursion of the apparatus, will be rectified by the engagement of the bell crank 51 with the alligator jaws when the apparatus is returned to operating position.

While the invention has been illustrated in what is considered its best application, it may have other embodiments without departing from its spirit and is not therefore, limited to the apparatus shown in the drawings.

What I claim is:

The combination with a cabinet of a moving picture apparatus therein, a swinging support for said apparatus, a door for said cabinet, closing an opening through which access to said apparatus may be had and means on said door for supporting said apparatus when said apparatus is out of normal position.

In testimony whereof I have signed this specification this 5th day of August, 1919.

AUSTIN DAY BRIXEY.